Feb. 17, 1942.  R. G. ROBERT  2,273,663
ANTISKIDDING DEVICE FOR AUTOMOBILES
Filed Feb. 27, 1939  2 Sheets-Sheet 2
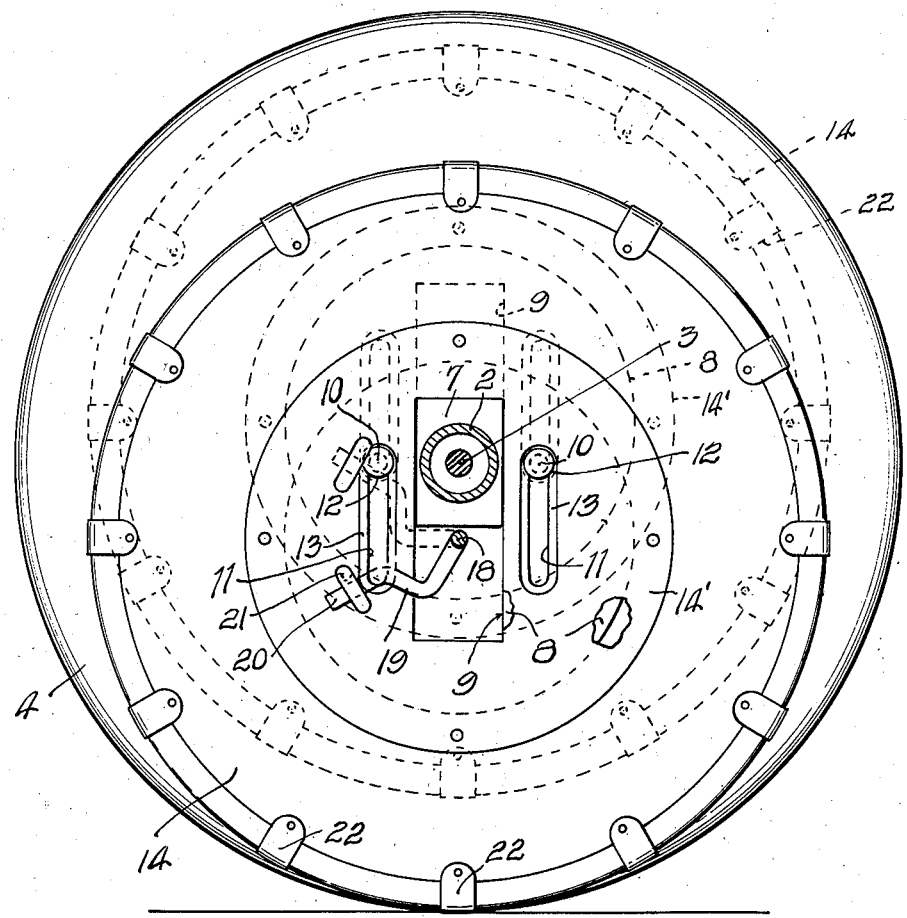
Fig. 4
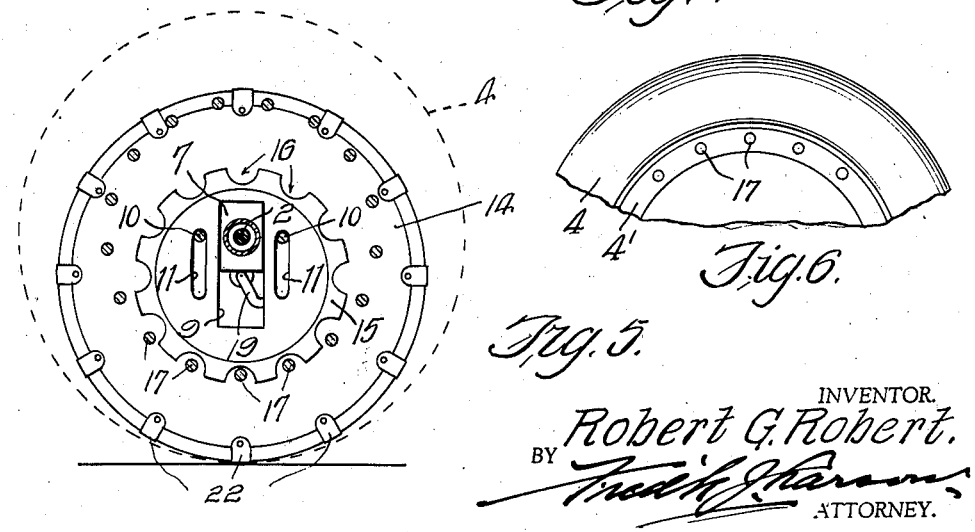
Fig. 5.
Fig. 6.
INVENTOR.
Robert G. Robert.
BY
ATTORNEY.

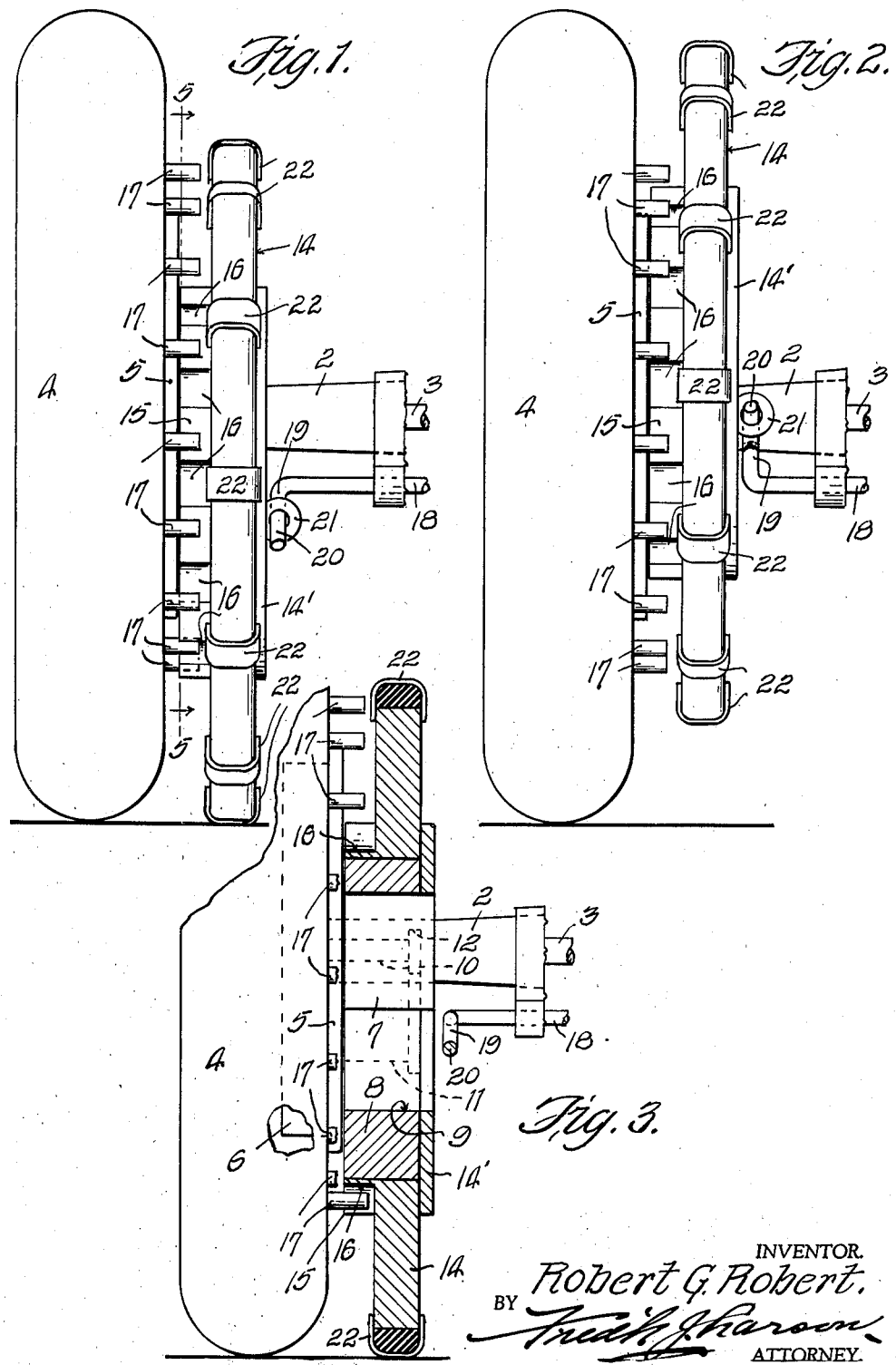

Patented Feb. 17, 1942

2,273,663

UNITED STATES PATENT OFFICE 2,273,663

ANTISKIDDING DEVICE FOR AUTOMOBILES

Robert G. Robert, St. Louis, Mo.

Application February 27, 1939, Serial No. 258,642

3 Claims. (Cl. 180—15)

My invention relates to anti-skidding device for the wheels of an automobile.

The object of my invention is to provide an anti-skidding device which can be applied to the present makes of automobiles, and, which embodies a wheel mounted for rotation alongside the inside of the rear wheels of an automobile which can be raised and lowered relative to the ground, and when lowered to serve as an anti-skidding device, and when raised to be free to rotate should the outer periphery thereof come into contact with any ground object.

A further object of the invention resides in means for rotatably mounting the anti-skid wheel and which means can be raised and lowered, by suitable means, to raise and lower the anti-skid wheel, when desired.

A still further object of the invention resides in means for connecting the anti-skid wheel with a driven wheel so that both wheels will rotate together when the anti-skid wheel is lowered, and so connected that the anti-skid wheel will rotate either forwardly or rearwardly with the driven wheel.

A still further object of the invention resides in means for changing the axis of the anti-skidding wheel from a point below the axis of the driven wheel when in its lowermost position to a point above the axis of the driven wheel when moved to its uppermost position.

With the above and other objects in view, the invention consists in the novel features of construction, arrangement and combination of parts hereinafter more fully described and finally pointed out in the claims hereto appended.

Referring to the drawings:

Fig. 1 is an elevation of an anti-skid wheel for automobiles, the same being shown as co-operating with the left drive wheel and shown in its lowered operative position in contact with the road surface.

Fig. 2 is an elevation of the anti-skid device similar to Fig. 1, but showing the anti-skid wheel raised from the contact with the road surface.

Fig. 3 is a sectional view through the anti-skid wheel and its supporting structure.

Fig. 4 is an inside elevation of the anti-skid device or wheel cooperating with one of the automobile drive wheels, the same being shown in lowered position, in full lines, and, in raised position in dotted lines.

Fig. 5 is a view taken on line 5—5 of Fig. 1.

Fig. 6 is a fragmentary view showing the wheel felly with the drive pins.

Referring to the drawings, the reference character 2 designates the axle housing; 3 designates the axle; 4 designates one of the drive wheels; 5 the brake shoe supporting plate; 6 the brake drum associated with the drive wheel 4.

Secured to the axle housing 2, is a suitable block like member 7 upon which a vertically movable bearing member 8 is mounted. Th bearing member 8 is provided with a suitable slot 9 to receive the block 7. In one embodiment of the invention, the bearing member 8 is held in proper position by means of a pair of bolts 10 which are anchored in the stationary brake shoe supporting plate 5, and which pass through slots 11 in the bearing member 8 and are provided with heads 12 engaging the face 13 of the bearing member 8.

A suitable anti-skid wheel 14 is mounted for rotation on the bearing member 8 and is held in position between the brake shoe plate 5 and a suitable face plate 14' secured to the face 13 of the bearing member 8.

The anti-skid wheel 14 is provided with a facial boss or hub 15, which is provided with a series of spaced peripheral notches 16.

A plurality of drive pins 17 project laterally from the felly portion 4' of the drive wheel 4 and one or more of these pins are adapted to engage in the notches 16 on boss 15 only when the anti-skid wheel 14 is lowered to roll on the road surface.

When the skid wheel 14 is in its lowered position, certain of the pins 17, at a time, will serve to drive, or rotate the anti-skid wheel 14 in either direction of the bearing 8, due to there being received by the boss notches 16, and when the vehicle brake is set in the usual manner to stop rotation of the drive wheel 4, rotation of the anti-skid wheel 14 likewise ceases, due to the pin connections 17 between the felly portion of the drive wheel 4 and the peripheral notches on the boss 15 of the anti-skid wheel 14.

When the anti-skid wheel 14 is raised free from contact with the road surface, as clearly shown in Fig. 2, it will be apparent that the drive wheel 4 will rotate without rotating the anti-skid wheel 14, as the drive pins 17 will not become engaged in the notches 16 on the boss 15 of anti-skid wheel 14.

The means for raising and lowering the anti-skid wheel 14, is shown, in one embodiment thereof, as comprising a suitably supported rod 18 having an angularly shaped arm 19 terminating in a finger 20, which passes through an eyebolt 21 secured to the bearing face plate 14', which plate is secured to the bearing member 8. By turning the rod 18 in one direction, the angular arm 19 and its finger 20 is moved downwardly, thereby lowering the bearing member 8 and the skid-wheel 14 mounted thereon, and, by turning the rod 18 in the opposite direction, raising the bearing member 8 and the skid-wheel 14 therewith. The means for turning the rod, it is believed unnecessary to illustrate, as the rod 18 can be manually turned, or it may be mechanically turned in any well known manner.

Suitable anti-skid elements 22 can be secured to the tread portion of the anti-skid wheel 14 and the tread portion may include a suitable tire, or its equivalent. The elements 22 may be secured to, and removed from, the anti-skid wheel individually, or the tread of the wheel can be so fashioned, or formed to provide the necessary anti-skidding tread surface. In case the tire on the drive wheel should become punctured, the anti-skid wheel can be lowered, and, in this emergency, the vehicle can travel on the anti-skid wheel until convenient to change the deflated tire.

From the foregoing description, it will be apparent that when the anti-skid wheel 14 is lowered, and the vehicle brake is set, greater traction surface is provided than without the use of the anti-skid wheel 14, and, that the anti-skid wheel 14 is conveniently operated to engage the road surface whenever desired to prevent skidding on a slippery road surface.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention may be made without conflicting or departing from the spirit of the invention within the scope of the appended claims.

What I claim is:

1. In combination with an axle housing and a motor driven wheel, of a vertically movable bearing member through which the axle housing passes, crank means for raising and lowering of the bearing member, an anti-skid wheel mounted for rotation on the bearing member, a hub on the anti-skid wheel having spaced peripheral notches, spaced pins projecting laterally from the vehicle wheel, certain of the lowermost pins adapted to engage in certain of the lowermost hub notches when the anti-skid wheel is in its lowermost position to cause the anti-skid wheel to be driven by the vehicle wheel and held against rotation when the motor driven wheel has been locked by the usual brake mechanism.

2. In combination, a vehicle drive wheel, spaced circularly arranged pins projecting laterally from the drive wheel, an axle housing, a block having opposed vertical slide surfaces secured to and surrounding the axle housing, a bearing member having a vertically disposed slotted opening mounted for vertical reciprocal movement on the block, a brake shoe plate, guide pins secured to said plate and projecting through slotted openings in the bearing member on opposite sides of the first mentioned slotted opening therein, an anti-skid wheel mounted for rotation on the bearing member, a hub formed on one side of the anti-skid wheel and having spaced peripheral notches, a crank member mounted on the axle housing, a connection between said crank member and the bearing member for raising and lowering the bearing member upon corresponding turning movement of the crank member, the lowermost hub notches engaging drive wheel pins when the bearing member has been lowered to cause the anti-skid wheel to engage the road surface and cause the anti-skid wheel to rotate with the drive wheel, and said anti-skid wheel being non-rotatable relative to the drive wheel when the usual brake has been applied to the drive wheel.

3. An anti-skid wheel comprising a disk like member, a tire on said member, a hub projecting from one side of the member, said hub having spaced circumferentially arranged notches formed thereon, a bearing member upon which the wheel is mounted for rotation in either direction, said bearing member having a vertically disposed slotted opening, and a pair of relatively narrow slotted openings on either side of the first mentioned slotted opening.

ROBERT G. ROBERT.